United States Patent [19]

Ogawa et al.

[11] Patent Number: 4,679,176
[45] Date of Patent: Jul. 7, 1987

[54] ULTRASONIC RECEIVING APPARATUS

[75] Inventors: Toshio Ogawa, Itukaichi; Shinichi Kondo; Shinichiro Umemura, both of Hachiouji; Kageyoshi Katakura, Meguro, all of Japan

[73] Assignees: Hitachi, Ltd.; Hitachi Medical Corporation, both of Tokyo, Japan

[21] Appl. No.: 673,945

[22] Filed: Nov. 21, 1984

[30] Foreign Application Priority Data

Nov. 24, 1983 [JP] Japan .................................. 58-219461
Nov. 30, 1983 [JP] Japan .................................. 58-224198
Jan. 27, 1984 [JP] Japan .................................. 59-11976

[51] Int. Cl.⁴ .................................................. G01S 3/80
[52] U.S. Cl. ..................................... 367/119; 367/122; 367/123; 367/103

[58] Field of Search ................. 367/99, 100, 103, 123, 367/122, 119

[56] References Cited

U.S. PATENT DOCUMENTS 4,107,685  8/1978  Martin et al. ...................... 367/122
4,166,999  9/1979  Brady, III ......................... 367/122

Primary Examiner—Thomas H. Tarcza
Assistant Examiner—Daniel T. Pihulic
Attorney, Agent, or Firm—Antonelli, Terry & Wands

[57] ABSTRACT

In an ultrasonic imaging apparatus, when a sampling time space determined corresponding to the respective phases of receiving signals from transducer elements adjacent to each other is shorter than the settling time of sample and hold circuits, these receiving signals are sampled at the same time. Noise is prevented from being mixed with the sample and hold values of these signals.

23 Claims, 5 Drawing Figures

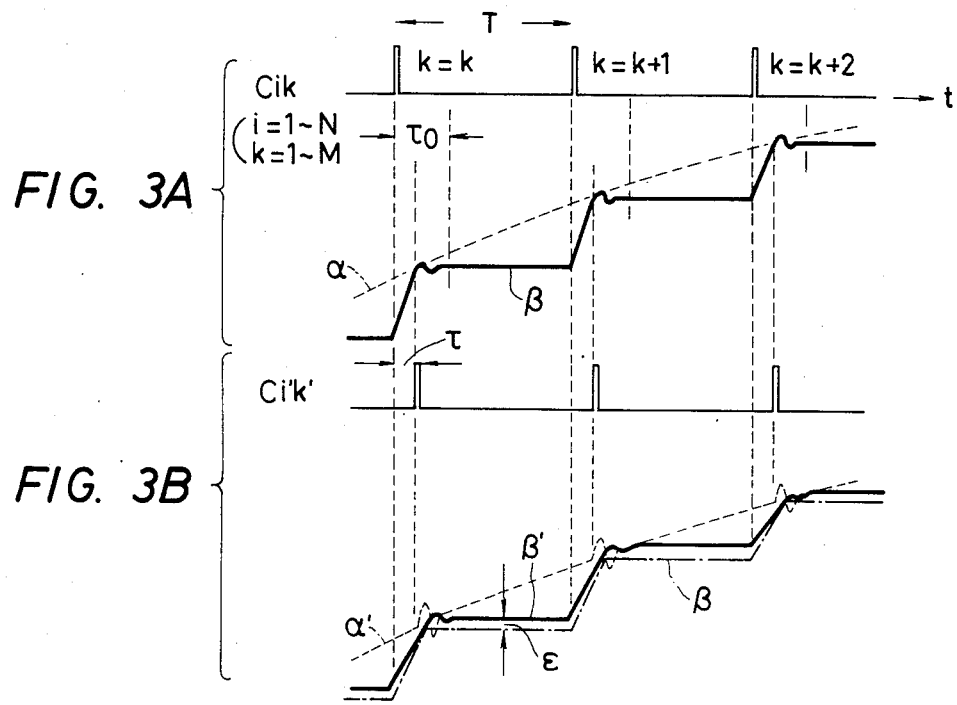
FIG. 3A
FIG. 3B
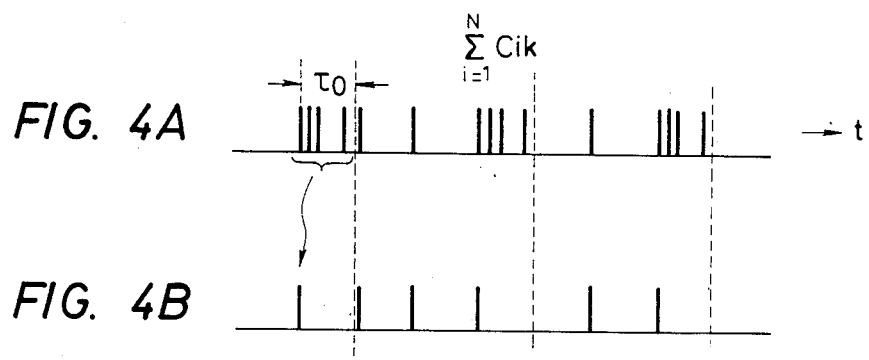
FIG. 4A
FIG. 4B

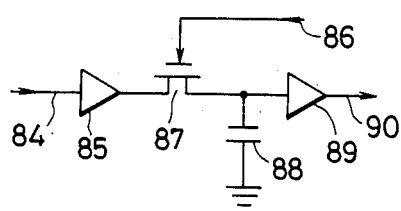
FIG. 15
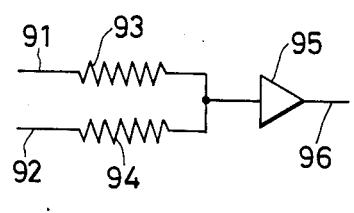
FIG. 16
FIG. 17
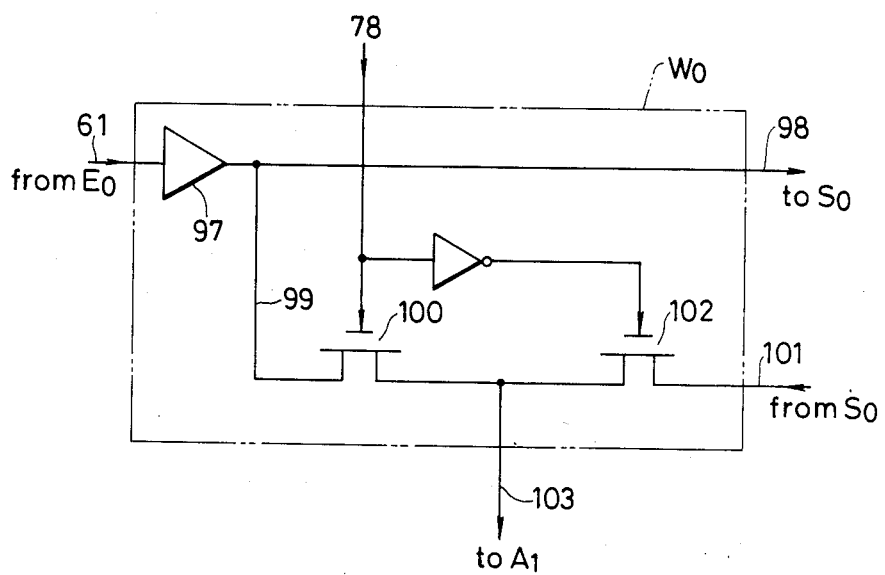

ULTRASONIC RECEIVING APPARATUS

BACKGROUND OF THE INVENTION

This invention relates to an ultrasonic receiving apparatus and more particularly to, for instance, a receiving part of an ultrasonic imaging apparatus. The present invention is useful as a receiving beam former or receiving beam deflection circuit for an ultrasonic imaging apparatus.

FIG. 1 shows an arrangement of a conventional receiving beam former comprising transducer elements arranged in an array 1, 2 . . . , N, analog delay circuits 10-1~10-N composed of inductance and capacitance, an adder 11 and an output terminal 12. Numeral 16 shows the phase front of receiving signals. Of the elements arranged in an array, since those on the central side receive the signal in an advanced phase as compared with those on the outer side, the receiving signals of all the elements can be added together in an equiphase relationship by delaying those on the central side.

The drawbacks of the conventional receiving beam former include limitations of frequency characteristics, difficulty of micro delay control, greatly enlarged hardware, etc.

On the other hand, as shown in FIG. 2, an arrangement that has once been proposed comprises signal holding means 13-1~13-N using capacitors known as sample and hold circuits and a controller 14, whereas control signals and examples of the control signals are represented by C1k~CNk and 17-1~17-N, respectively.

All the receiving signals can thus be coherently added by sampling the receiving signals on a concave line corresponding to the time at which the receiving signals reach the transducer elements and adding the sampled signals together.

Referring to FIGS. 3A and 3B, problems inherent in the conventional method will be described. Cik represents the control signal of the sample and hold circuit 13-i of FIG. 2, where i=1~N (N is the number of transducer elements) and k=1~M (M is a number indicating a time series). T represents a sampling period indicating, for instance, the value of 100~500 ns. $\tau_o$ represents the settling time of the sample and hold circuit, its value being roughly equal to 10 ns, for instance. Ci'k' represents a control signal of the receiving signal of the transducer element different from Cik and the time difference between Cik and Ci'k' is assumed to be $\tau$. $\tau_o$, $\tau$ are shown in enlarged scale compared with T for convenience of illustration.

FIG. 3A indicates a case where a receiving signal $\alpha$ is ideally sampled and held, whereby an output $\beta$ is obtained. In this case, the sample and hold output is in a transitional state within the range from the control signal Cik to the settling time $\tau_o$ and the signal becomes correct after the time $\tau_o$.

However, in case the control signal Ci'k' of the receiving signal of the transducer element of i' different from i exists in Cik the time $\tau$ ($\tau<\tau_o$) later, noise will be mixed with the receiving signal $\alpha$ because of electric coupling and the mixture will become a receiving signal $\alpha'$.

Since the time at which the noise appears is less than the settling time of the sample and hold circuit, the output of the sample and hold circuit becomes $\beta'$ as shown in FIG. 3B, causing an error $\epsilon$ between $\beta'$ and the ideal output $\beta$. As a result, problems are posed on the operation of the receiving beam former relative to the dynamic range of the signal, S/N ratio and the like.

SUMMARY OF THE INVENTION

An object of the present invention is to provide an ultrasonic wave receiving apparatus with a high S/N ratio and a greater dynamic range.

The above object may be accomplished by providing an ultrasonic wave receiving apparatus according to the present invention, the ultrasonic wave receiving apparatus comprising a plurality of transducers elements arranged regularly; sample and hold circuits for sampling and holding signals respectively received by the transducer elements or groups of signals obtained by adding predetermined number of these signals together; and a controller generating control signals respectively for controlling the sample and hold circuits in such a manner as to sample the receiving signals or the groups of signals at the time corresponding to the phases of the signals or the groups of signals, so that the receiving signals from the transducer element adjacent to each other or the groups of signals adjacent to each other may be sampled at the same time when sampling time space determined corresponding to the respective phases of receiving signals from the transducer elements adjacent to each other or the groups of signals adjacent to each other is shorter than a predetermined value determined according to the settling time of the sample and hold circuits

BRIEF DESCRIPTION OF THE DRAWINGS

FIGS. 3A and 3B illustrate problems of the method of prior art.

FIGS. 4A and 4B illustrate time sequence showing the time series of an example of the control signal used in the present invention.

FIGS. 15 through 20 illustrate examples of the principal portion of FIG. 13 in concrete terms.

DETAILED DESCRIPTION OF THE INVENTION

FIGS. 4A and 4B illustrate an example of the control signal used in the present invention as compared with the conventional method.

FIG. 4A indicates control signals ΣCik of all transducer elements on the same axis of time series in connection with the control signals Cik through the conventional method and the aforementioned problems are posed as the time space between the control signals Cik may exist within the settling time $\tau_o$ of the sample and hold circuit.

According to the present invention, as shown in FIG. 4B, if the time space between the control signals Cik∼Ci'k' (∼ is the difference) is equal to or greater than a predetermined value $\tau_0$, Ci'k'=Ci'k' and, if it is smaller than $\tau_o$, Ci'k'=Cik.

The adequacy of this operation will be described subsequently.

If phasing accuracy is worsened, it will generally cause deterioration of the sensitivity of the main beam in acoustic beams, increases in the beam width of the main beam and an undesired acoustic noise level. The third defect among these three poses a problem. In the case of an ultrasonic frequency of 3.5∼5.0 MHz of an ultrasonic imaging apparatus, if phasing accuracy of the beam phaser is roughly less than 10∼30 ns, an increase in the undesired acoustic level will be such that it may be disregarded in practice. Since the settling time $\tau_o$ of the sample and hold circuit is about 10 ns, the acoustic characteristics will not be affected even if the time of the sample and hold control signal is changed by the operation according to the present invention; thus the problems in the conventional method may be solved.

In the description above, the predetermined value was equivalent to the settling time $\tau_o$ of the sample and hold circuit. It is possible to consider various forms of the predetermined value. For instance, there may be adopted the method of making the predetermined value $\tau_o/2$; in other words if $Cik \sim Ci'k' \geq \tau_o$, $Ci'k' = Ci'k'$, if $Cik \sim Ci'k' \geq \tau_o/2$, $Ci'k' = Cik + \tau_o$ and, if $Cik \sim Ci'k' < \tau_o/2$, $Ci'k' = Cik$.

DETAILED DESCRIPTION OF PREFERRED EMBODIMENTS

Figure 5:
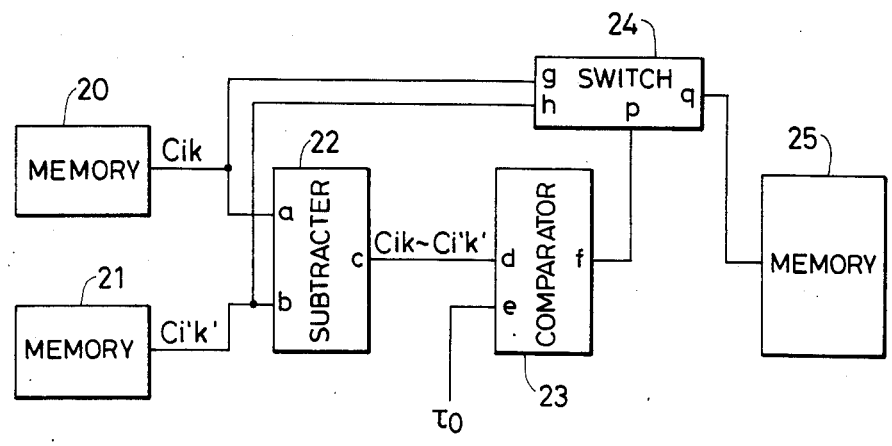
FIG. 5 is a block diagram illustrating an embodiment of the present invention.

FIG. 5 is a block diagram of an embodiment of the present invention wherein an arrangement includes a memory 20 of the control signal Cik, a memory 21 of the control signal Ci'k', a subtracter 22, input terminals a, b, an output terminal c, a comparator 23, a time difference Cik∼Ci'k' input terminal d for control signals, a constant predetermined value (the predetermined value being equal to the settling time $\tau_o$ in this embodiment) input terminal e, an output terminal f for outputting the control signal 1 when the time difference Cik∼Ci'k' exceeds the predetermined value $\tau_o$ and the control signal 0 when it does not exceed the predetermined value, a changeover switch 24, input terminals g, h, a control signal f input terminal p and an output terminal q. When the control signal f is 1, the terminals h and q are connected and the control signal Ci'k' is generated by the terminal q. When the control signal f is 0, the terminals g and q are connected and the control signal Cik is generated by the terminal q. The output is stored in a memory 25, which is contained in the controller 14 of the receiving beam former of FIG. 2.

Figure 6:
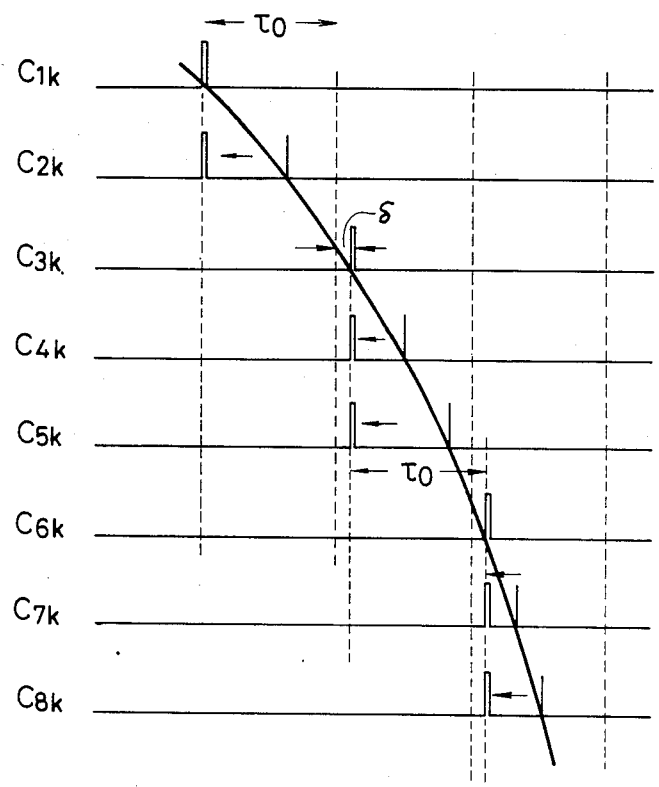
FIG. 6 is an operational diagram of FIG. 5.

Referring to FIG. 6, the operation of FIG. 5 will be described further. When the number of transducer elements=8, $C_2k$ is first determined with i=1, i=2 and $C_1k$ as a reference. Since $C_2k - C_1k < \tau_o$, correction is made in the direction of arrow. Subsequently, since $C_3k - C_2k > \tau_o$ regarding $C_3k$ and the corrected $C_2k$, $C_3k = C_3k$ (no correction). Subsequently, $C_4k$ is corrected with $C_3k$ as the reference. At this time, the reference point has moved by δ. The correction of all the control signals is completed in the same manner as mentioned above.

Although the channels adjacent to each other have been corrected according to the description above, there is another simple method as follows; that is, all the control signals Cik are quantized with the predetermined value $\tau_o$ as a quantization step. It is also obvious in this case that the effect of the present invention as shown in FIG. 4B can be attained. In this case, the time difference δ of FIG. 6 is equivalent to 0 and roughly the same as a beam former characteristic.

Obviously according to the embodiment of FIG. 5, the operation of FIG. 4B is effective.

Figure 1:
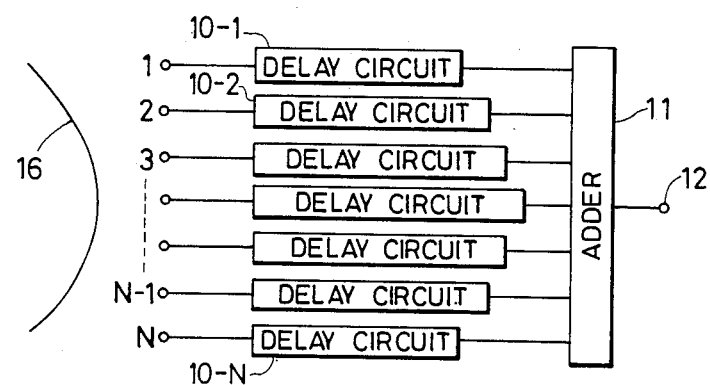
FIG. 1 illustrates a conventional beam former.
Figure 2:
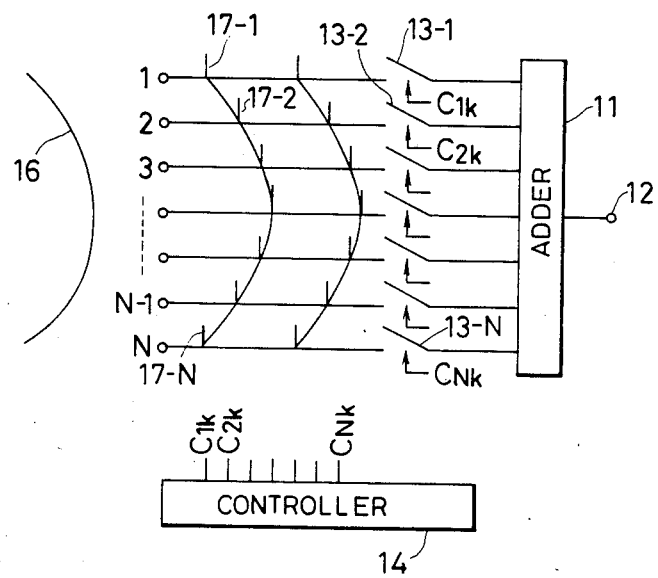
FIG. 2 illustrates a sample and hold type beam former.

The above description refers to the arrangement of FIG. 2, that is, the sample and hold type receiving beam former. However, the same effect is also expected in a receiving beam former including an analog to digital converter (A/D converter).

Figure 7:
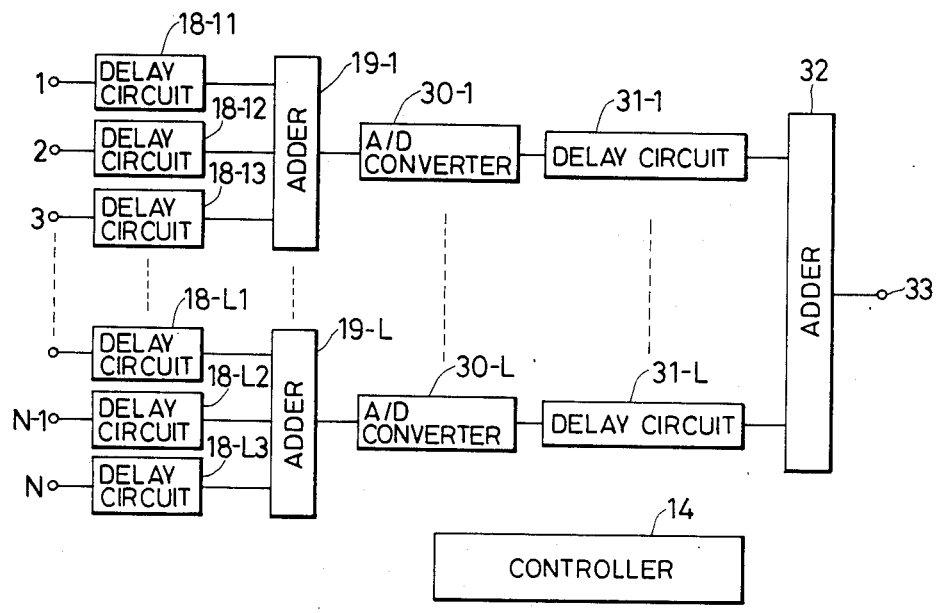
FIG. 7 is a block diagram illustrating another embodiment of the present invention.

In FIG. 7, an arrangement includes transducer elements arranged in the order of 1, 2, 3, . . . N−1, N, delay circuits 18-11, 18-12, 18-13, . . . 18-L1, 18-L2, 18-L3 for respectively delaying the signal received by each transducer element for a comparatively short time, adders 19-1, . . . 19-L (L=N/3) each for adding output signals in three delay circuits, A/D converters 30-1, . . . 30-L each for converting the output signals of the adders into digital signals, delay circuits 31-1, . . . 30-L each for delaying the output signals of the A/D converters for a comparatively long time, an adder 32 for adding the outputs of the delay circuits, an output terminal 33 of the adder and the controller 14 for controlling the operation of the delay circuits and A/D converters. Fixed delay lines or sample and hold circuits are used as delay circuits 18-11, . . . 18-L3 for providing a comparatively short delay time, whereas memory devices are used as delay circuits 31-1, . . . 31-L for providing a comparatively long delay time.

In the case of an analog to digital converter like this, the control signal of another analog to digital converter is superimposed on the analog signal through electric coupling and the characteristics of the beam former deteriorate. The present invention is effective in solving that problem. In the sample and hold action of the analog signal prior to the A/D conversion in each of the A/D converters 31-1, . . . 31-L, if the time space between the sampling time in an A/D converter and that of the following A/D converter is shorter than the settling time $\tau_o$ required for the sample and hold operation of these A/D converters, the control signal of the A/D converter effecting the following sampling will be mixed with that of the A/D converter effecting the preceding sampling as a noise. According to the present invention, the noise mixture is avoided.

According to the present invention, if the sampling time space determined correspondent to each of the phase of the analog signal between two A/D converters adjacent to each other is shorter than the predetermined value determined based on the settling time $\tau_o$ of the sample and hold operation of these A/D converters, these A/D converters adjacent to each other will be so controlled as to sample the analog signals at the same time. The predetermined value may be set equal to the settling time $\tau_o$ of the sample and hold operation in the A/D converter or $\tau_o/2$. Moreover, the sampling space between these A/D converters may be quantized with the settling time $\tau_o$ as a quantization step (quantization increment).

Four examples of ultrasonic wave receiving apparatuses including A/D converters will be described.

In an ultrasonic imaging apparatus, an ultrasonic beam must be deflected to display a trapezoid field of view. In order to deflect the ultrasonic beam, it is required to control the phases of the transmitting and receiving signals of each transducer element.

Figure 8:
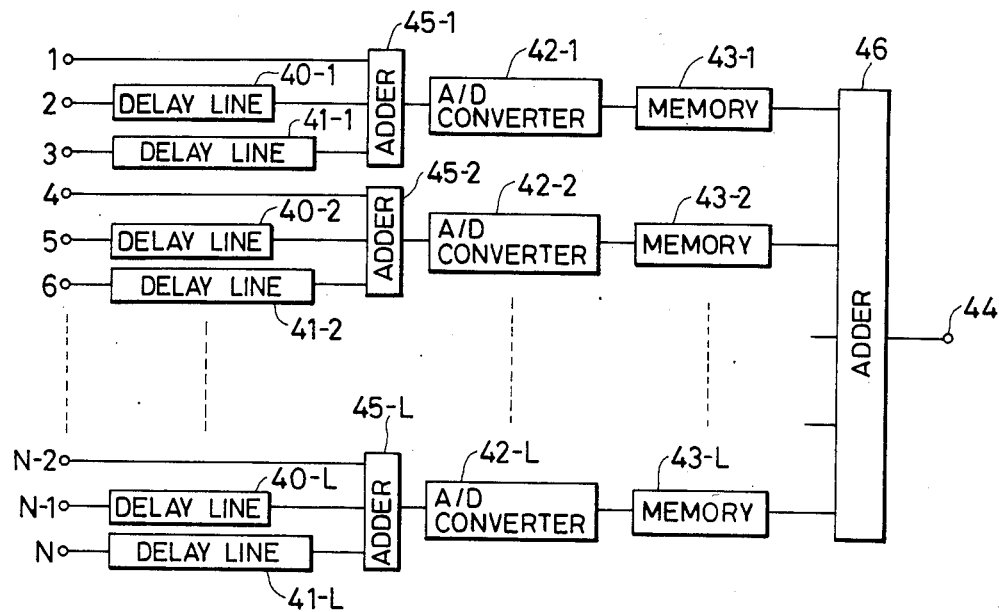
FIGS. 8 and 9 are block diagrams illustrating other embodiments of the present invention.

FIG. 8 shows the construction of a receiving beam former for obtaining a deflection angle $\theta$, the receiving beam former comprising transducer elements 1, 2, ... N arranged in an array, fixed delay lines 40-1~40-L, 41-1~41-L, analog to digital converters 42-2~42-L, memories 43-2~43-L, an output terminal 44 and adders 45-1~45-L and 46. The delay time $\tau_\theta$ of the fixed delay lines 40-1~40-L is given by $$\tau_\theta = d \sin\theta / v \quad (1)$$

where $\theta$: deflection angle; d: space between transducer elements; and v: sound speed.

The delay time of the fixed delay lines 41-1~41-L is $2\tau_\theta$.

According to the construction, it is possible to phase relatively large delay time by the A/D converters 42-1~42-L and the memories 43-1~43-L after the small delay time for the deflection angle $\theta$ is phased by the fixed delay lines 40-1~40-L. In this case, the relatively large delay time $T_\theta$ is given by $$T_\theta = 3\tau_\theta(K-1) + \tau_f.$$

However, $\tau_f$ is delay time for convergence K = 1, 2, ... L

Figure 9:
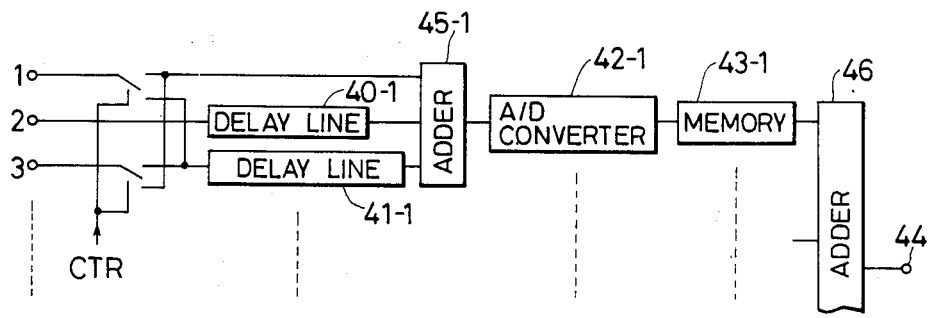

In order to scan a negative deflection angle $-\theta$, the input terminal of the delay line for small delay phasing should be switching over to a control signal CTR as shown in FIG. 9.

Figure 10A:
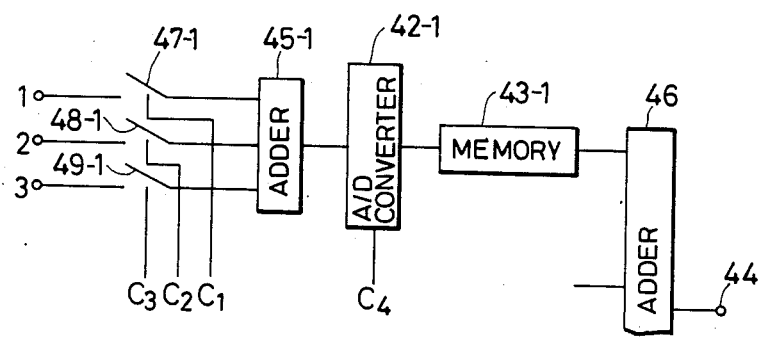
FIGS. 10A and 10B are a block diagram illustrating a still another embodiment of the present invention and its operational diagram.
Figure 10B:
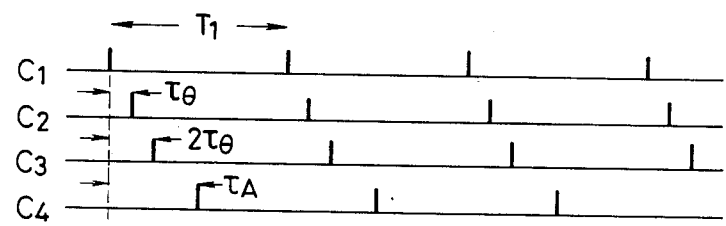

FIGS. 10A and 10B are a block diagram illustrating another embodiment of the present invention and its control signal time chart. The arrangement thereof includes sample and hold circuits 47-1, 48-1, 49-1 together with control signals $C_1 \sim C_4$, the rest being the same as those of FIG. 8. The control signal $C_1$ is equivalent to the timing of a transmitting wave pulse, whereas the control signals $C_2$, $C_3$ and $C_4$ are delayed by $\tau_\theta$, $2\tau_\theta$ and $\tau_A$ relative to $C_1$, provided $\tau_A > 2\tau_\theta$.

According to the arrangement, the receiving signals applied to the elements 1, 2, 3 each are held at the timing of the control signals $C_1$, $C_2$, $C_3$ by means of the sample and hold circuits 47-1, 48-1, 49-1, added together by the adder 45-1, digitized by the A/D converter 42-1 at the time of the control signal $C_4$ and written to the memory 43-1.

Obviously, it is possible to phase the deflection angle $-\theta$ by exchanging the control signals $C_1$ with $C_3$.

There is the following relation between a sampling period $T_1$ and an ultrasonic wave frequency $f_o$ according to the sampling principle:

$$T_1 \leq \frac{1}{2} f_o \quad (2)$$

In the case of a frequency of 3.5 MHz, for instance, $$T_1 \leq 143 \ ns \quad (3)$$

Accordingly, in the case of FIGS. 10A, 10B, $$2\tau_\theta \leq T_1 = 143 \ ns$$

$$\tau_\theta < 71 \ ns$$

and, in case the element pitch d = 1.0 mm, the deflection angle $\theta_1$ becomes $$\theta_1 < 6 \ (deg) \quad (4)$$

so that a great deal of restriction is imposed on the maximum deflection angle.

The quadrature sampling method has been adopted to mitigate such restriction to increase the sampling period.

In other words, the sampling period $T_2$ through that method is given by $$T_2 < \frac{1}{2} f_e \quad (5)$$

Where, fe is the envelope frequency of an ultrasonic pulse signal and, since $$f_e \approx f_o \times \frac{1}{4} \quad (6)$$

$$T_2 < 2/f_o < 4 \times T_1 \quad (7)$$

In the case of the element pitch d = 1.0 mm, the deflection angle $\theta_2$ is $$\theta_2 < 26 \ (deg) \quad (8)$$

Thus practical receiving beam deflection becomes possible.

Figure 11A:
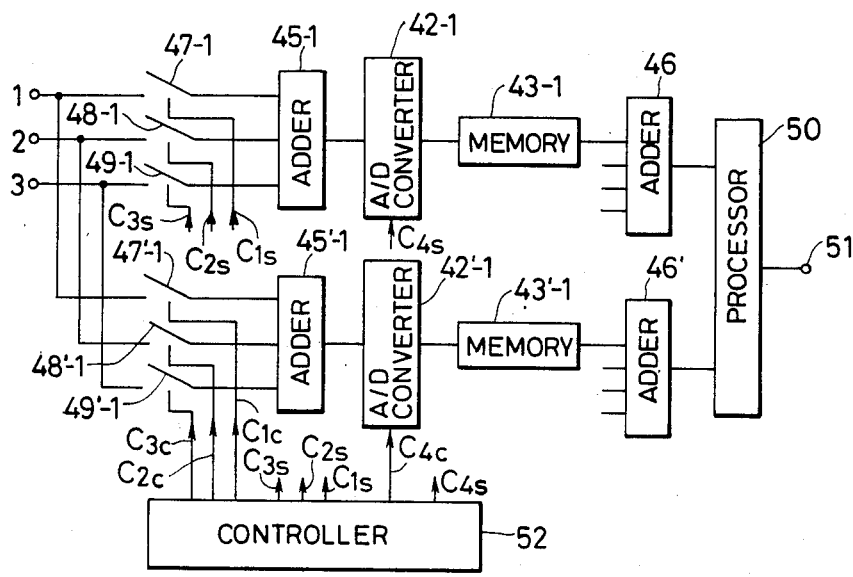
FIGS. 11A and 11B are a block diagram illustrating a further embodiment of the present invention and its operational diagram.
Figure 11B:
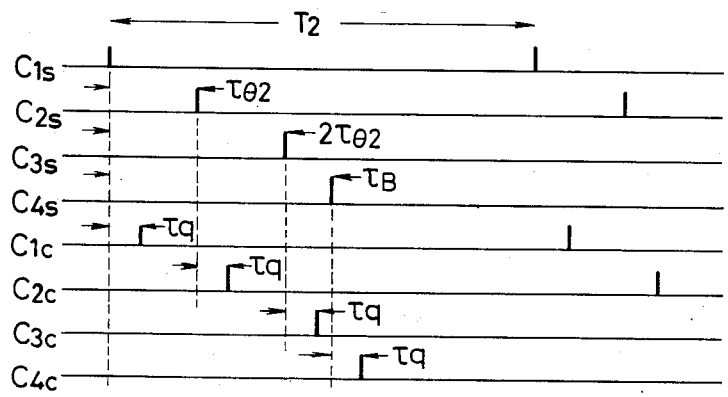

FIGS. 11A and 11B show an embodiment of the present invention based on the quadrature sampling system adopted wherein the sine component comprises a combination of beam forming circuits, that is, sample and hold circuits 47−1, 48−1 and 49−1, adders 45−1 and 46, and analog to digital converter 42−1, a memory 43−1, whereby the component is controlled by control signals $C_1s$, $C_2s$, $C_3s$ and $C_4s$. Similarly, there is provided another combination of beam forming circuits (indicated by adding dashes to the above symbols) for a cosine component, which is controlled by control signals $C_1c \sim C_4c$.

Control signals $C_{is}$ and $C_{ic}$ (i = 1~4) are shown in FIG. 11B. In this case, the time space $\tau_q$ between both the signals is $$\tau_q = \frac{1}{4} \times 1/f_o \quad (8)$$

and the phase difference is equivalent to 90 (deg) of the ultrasonic frequency fo. $\tau_{\theta 2}$ is the delay time for obtaining the deflection angle $\theta_2$.

In FIG. 11A, numeral 50 indicates a processing circuit for extracting the square root for envelope detection, the circuit being used to compute $$\text{envelope component} = \sqrt{(\text{sine component})^2 + (\text{cosine component})^2} \quad (9)$$

There are also shown an output terminal 51, a control circuit 52 for generating the control signals $C_{is}$, $C_{ic}$ (i = 1~4) and actually effecting the generation thereof by reading out the data that have been stored in a read only memory (ROM) in a time series manner.

The advantage is that, according to the quadrature sampling, the variable delay range may be increased by reducing the sampling frequency.

In FIGS. 8, 9, 10A and 11A, the present invention is applied to the sample and hold operation in the A/D converters 42-1, ... 42-L, 42'-1, ... 42'-L. The embodiment of the present invention in reference to these A/D converters is similar to that of FIG. 7.

In addition, the present invention is also applicable to the sample and hold circuits 47-1, 48-1, 49-1, ... 47'-1, 48'-1, 49'-1 of FIGS. 10A and 11A.

As above described, although the present invention refers to the trapezoid field of view, it is also effective in sector scanning for changing the deflection angle on a scanning line basis.

Although reference has been made to the ultrasonic wave beam deflection, the present invention is also effective in beam convergence without deflecting beams as in the case of linear scanning.

Moreover, it is obvious that the present invention is effective in dynamic focusing, so to speak, for changing the focusing point in the direction of depth.

The above-described ultrasonic receiving apparatus employs the combination of A/D converters and digital memories to obtain receiving beams as output signals of the digital adder. As a result, there are problems with such an apparatus, in that it needs a number of expensive A/D converters and the number of signal lines increases because the addition of signals is carried out after the digitalization process.

Figure 12:
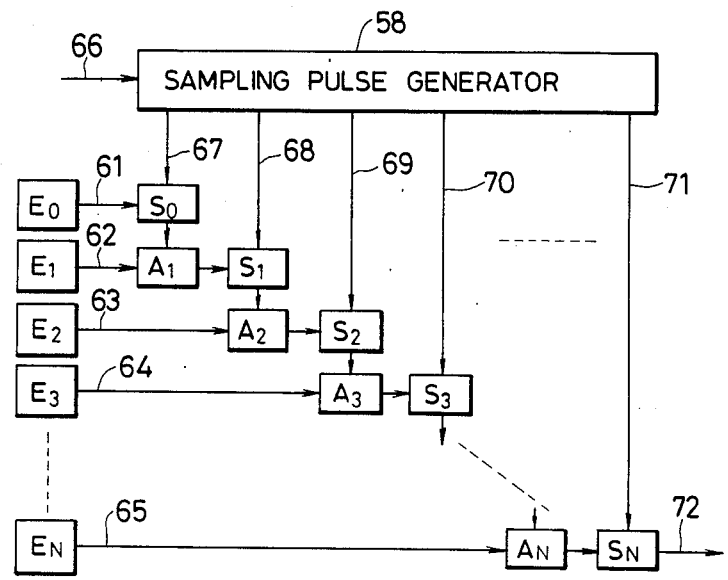
FIG. 12 is a block diagram of the ultrasonic wave receiving apparatus proposed by three of the present inventors in the previous Japanese Patent Application.

In order to solve the problems, three of the present inventors previously proposed the ultrasonic wave receiving apparatus of FIG. 12 (Japanese Patent Application No. 57-125774, filed on July 21, 1982). Referring to FIG. 12, the above-described apparatus will be described.

FIG. 12 shows a receiving beam former comprising sample and hold circuits and circuits for adding sampled and held signals to those from elements adjacent thereto, both the circuits being alternately cascade-connected. Transducer elements each, starting with one closer to the focus of receiving beams, are given symbols $E_0, E_1, E_2, \ldots E_n$ in order. A sampling pulse generator 58 generates each of the sampling pulses 67~71 at predetermined time intervals after transmission time according to a basic clock 66. The receiving signal 61 from the transducer element $E_0$ is sampled and held by a sample and hold circuit $S_0$ at the time that the equiphase front of the receiving signal reaches $E_0$. The sampled and held signal is added to the receiving signal 62 from the transducer $E_1$ by an adder $A_1$ and sampled and held by a sample and hold circuit $S_1$ at the time that the equiphase front of the receiving signal reaches the transducer element $E_2$. The sampled and held signal is added to the receiving signal 63 from the transducer element $E_2$ by an adder $A_2$ and sampled and held by a sample and hold circuits $S_2$ at the time that the equiphase front of the receiving signal reaches the transducer element $E_2$. The signal from a sample and hold circuit $S_{N-1}$ is added to the receiving signal 65 from the transducer $E_N$ by an adder $A_N$ and sampled and held by a sample and hold circuit $S_N$ at the time that the equiphase front of the receiving signal reaches the transducer element $E_N$, so that the output signal obtained from a series of operations may be used to form a receiving beam. Further a time series receiving signal is obtainable by effecting these operations successively while changing the positions of the receiving beam focus as required.

The operations of FIG. 12 may be summarized as follows:

A reflected phase front is assumed to be formed of an ultrasonic wave pulse transmitted from a transducer element and reflected from a virtual point reflector placed at the focal point. At the time that the equiphase of the phase front reaches each transducer element, each receiving signal is sampled and the signal value is held as an analog physical quantity such as charges stored in a capacitor, whereby the desired receiving beam is obtained by adding up a receiving signal value to be added and what has been held in an analog form.

Provided that the sampling times for signals from the transducer elements $E_{k-1}$ and $E_k$ are respectively set as $T_{k-1}$ and $T_k$, a range of time difference between them that is processable by the circuit is considered. If the sampling intervals necessary for obtaining the receiving signal as a time series is defined as $t_s$ and the transmission time at least required for the signal to be sampled and held by the sample and hold circuit $S_{k-1}$ until sampled and held by $S_k$ as $t_t$, $$t_t < T_k - T_{k-1} < t_s \tag{10}$$

Accordingly, the smaller $t_t$ and the larger $t_s$, the wider the circuit application range becomes.

However, the following problem is posed insofar as there is a lower limit to the time difference between $T_{k-1}$ and $T_k$. In other words, when the angle $\theta$ formed with a straight line connecting the intended element and the focus and a line perpendicular to the surface of the element becomes smaller than $\theta_c$ given by the following formula, that is, when the direction of the focus is extremely close to the front of the element, no proper sampling time difference is given to the receiving signals from the elements $E_{k-1}$ and $E_k$.

$$\sin \theta_c = c t_t / p \tag{11}$$

where c: sound speed; p: element pitch.

An important factor in the above-described transmission time $t_t$ is the settling time $\tau_o$ of the sample and hold circuit. According to the present invention, the problem posed when the aforementioned angle $\theta$ becomes smaller than $\theta_c$ defined by the expression (11) may be solved.

The sampling time determined correspondent to each of the phases of the signals from the transducer element $E_{k-1}$ and $E_k$ is referred to as $T_{k-1}$ and $T_k$. According to the present invention, if the sampling time space between $T_k$ and $T_{k-1}$ is less than the predetermined value determined based on the settling time $\tau_o$ of the sample and hold circuit $S_{k-1}$, the signal from the element $E_{k-1}$ will be added to the signal from the element $E_k$ without being sampled and held by the sample and hold circuit $S_{k-1}$. The signals from the element $E_{k-1}$ and $E_k$ are added, sampled and held simultaneously by the sample and hold circuit $S_k$.

Figure 13:
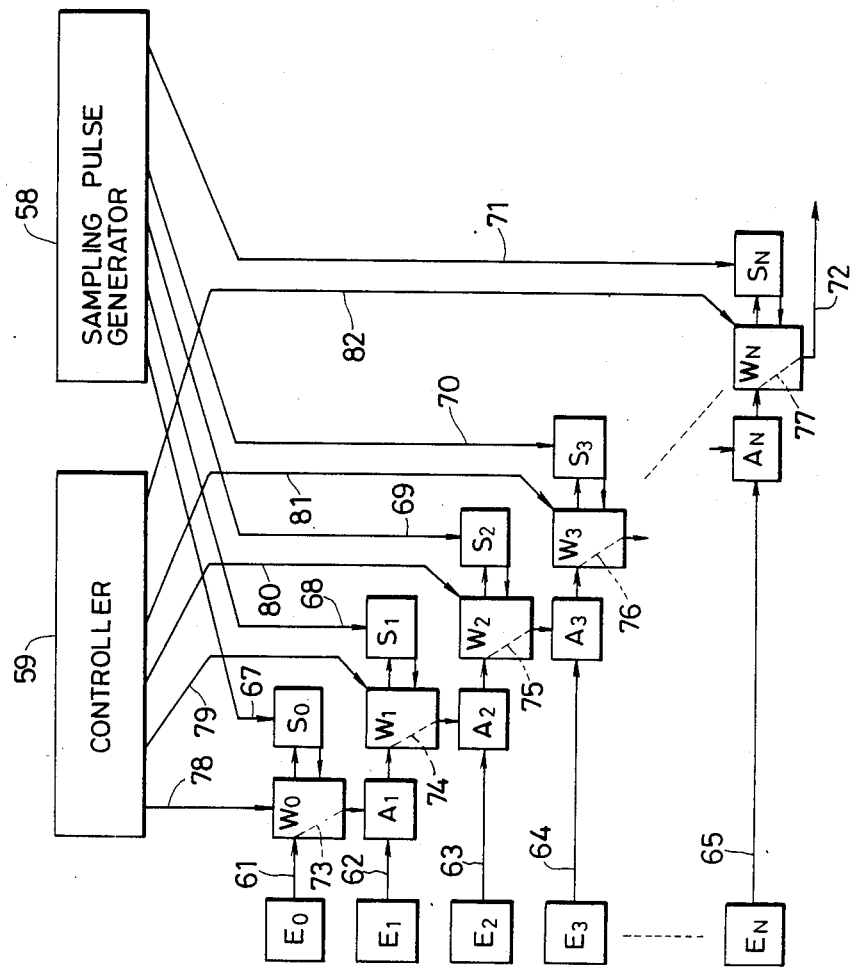
FIG. 13 is a block diagram illustrating an additional embodiment of the present invention.

FIG. 13 shows an embodiment of the present invention for realizing the above-described operation. Elements newly added to the apparatus of FIG. 13 in comparison with what is shown in FIG. 12 include signal channels 73~77 for bypassing the sample and hold circuits $S_1 \sim S_N$, changeover switch circuits $W_o$ TM $W_N$ for allowing the signal to bypass them and a controller 59 for generating control signals 78~82 for controlling the switches $W_o \sim W_N$ in such a manner that, when $\theta$ is smaller than $\theta_c$, the signal is bypassed via channels 73~77 and allowed to pass the sample and hold circuits $S_1$~$S_N$.

The above-mentioned predetermined value is, in the simplest way, selected to be equal to the settling time of the sample and hold circuit. $\tau_0/2$ may be defined as the predetermined value. In addition, $\tau_0$ may be used as a quantization increment to quantize the sampling time between the sample and hold circuits $S_O$~$S_N$.

Figure 14:
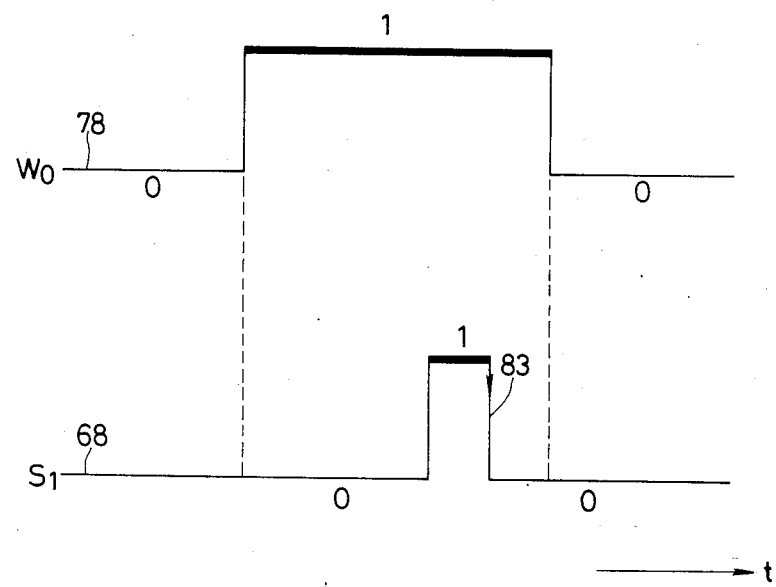
FIG. 14 is a time chart of the control signal of FIG. 13.

FIG. 14 shows an example of a control signal timing chart necessary for operating the circuit of FIG. 13, including the control signals 78 and 68 necessary for respectively a switching circuit $W_o$ when signals from the elements $E_o$ and $E_1$ are simultaneously sampled and held by the sample and hold circuit $S_1$. When the signal 78 is "1", the receiving signal bypasses the sample and hold circuit $S_o$ and passes through $S_o$ when signal 78 is "0". The gate of the sample and hold circuits $S_1$ remains open when the signal 68 is "1" and, when "1" is changed to "0", the receiving signal value at an edge 83 is sampled and held. The minimum requirement in order to simultaneously sample and hold the signals from the elements $E_o$ and $E_1$ is that the time at the edge 83 be in the term during which the signal 78 is "1". In the timing chart of FIG. 14, delay, if any, caused by the transmission time through the channel $W_o \rightarrow A_1 \rightarrow W_1 \rightarrow S_1$ is assumed to have been corrected.

FIG. 15 shows an example of the circuit configuration of the sample and hold circuits $S_o$~$S_N$ of FIG. 13. An input signal 84 passes through a buffer amplifier 85 and is sampled by a switching element 87 that is switched on and off by a switching signal 86, and is held in a holding capacitor 88, and then it becomes an output signal 90 after passing through a buffer amplifier 89. FIG. 16 shows an example of the circuit configurations of adder circuits $A_1$~$A_N$ of FIG. 13. Input signals 91 and 92 are added together by resistors 93 and 94 before being passed through a buffer amplifier 95 to become an output signal 96. FIG. 17 shows an example of the changeover switch circuit configurations $W_o$~$W_N$ of FIG. 13. Referring to the changeover circuit $W_o$, its operation will be described. The input signal 61, after passing through a buffer amplifier 97, is divided into two signal channels 98, 99 and the channel 98 is led to the sample and hold circuit $S_o$, whereas the other channel 99 is led to the adder circuit $A_1$ through a bypass channel passing through a switch 100 being opened and closed by the control signal 78. The output signal 101 from the sample and hold circuit $S_o$ is passed through a switch 102 being opened and closed by a polarity inverted signal of the control signal 78 and transmitted to the adder circuit $A_1$. In other words, either signal 99 or 101 is selected by the control signal 78 to become a signal 103 applied to the adder circuit $A_1$.

Figure 18:
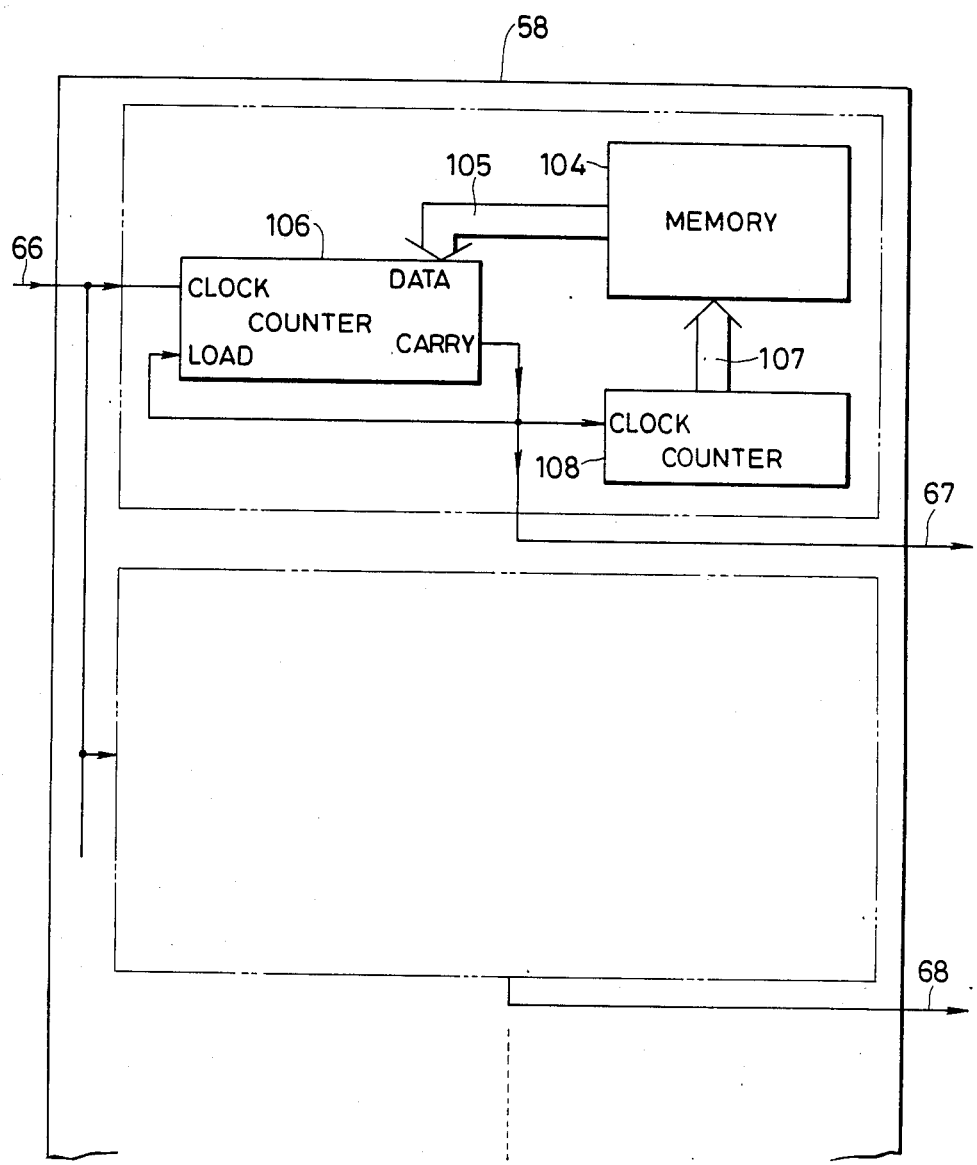

FIG. 18 shows an embodiment of the sampling pulse generator 58 of FIG. 13. The clock 66 is made to count by a counter 106 according to the output data 105 of a memory 104 and its carry signal becomes the sampling pulse 67. The pulse signal is input to a counter 108 used to form the address signal 107 of the memory, 104. In the memory 104 are stored data indicating predetermined sampling spaces and the data 105 indicating the predetermined sampling space are read out according to the selection of an address by means of the signal 107 from the counter 108. The data 105 are counted by counter 106. Although FIG. 18 indicates a case where the sampling pulse 67 of FIG. 13 is obtained, needless to say, it is also possible to obtain sampling pulses 68~71 from the sampling generating means having the same construction as above.

Figure 19:
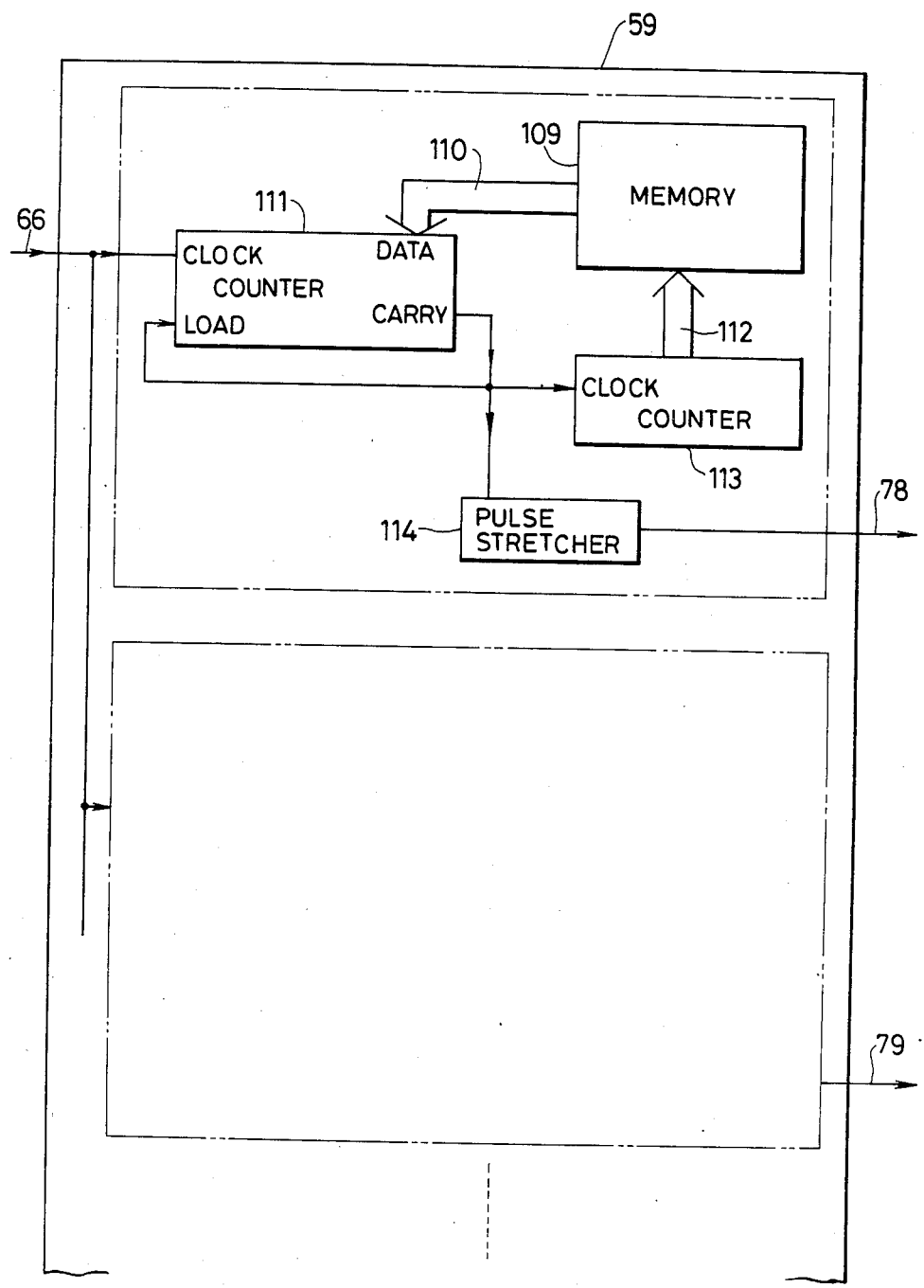

FIG. 19 shows an embodiment of the changeover switch control signal generator 59 (controller 59) of FIG. 13. The only difference between those of FIG. 18 and 19 lies in the fact that a pulse stretcher 114 is inserted in the output signal channel of the latter. The reason for the addition of the circuit is that the pulse length (time length in the section of status "1") of the changeover switch control signal must be, as shown in FIG. 14, generally longer than the sample pulse length.

Figure 20:
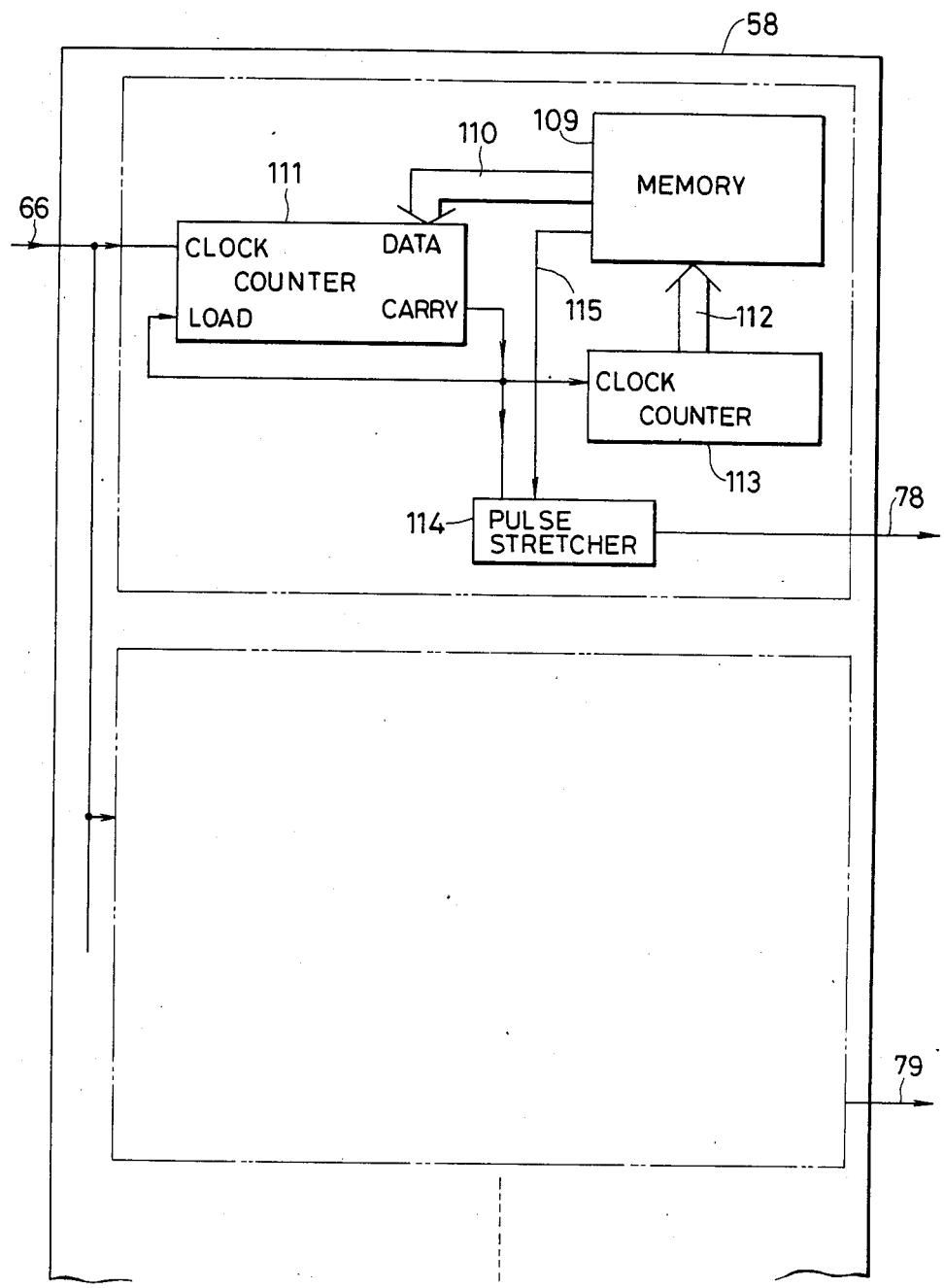

In FIG. 13, the sample and hold cirucuits $S_o$~$S_N$ are indicated separately from the changeover switch circuits $W_o$~$W_N$ for convenience of illustration. When some kinds of sample and hold circuits are used, however, the functions of the switch circuits $W_o$~$W_N$ may be included in the sample and hold circuits $S_o$~$S_N$ by controlling the pulse length of the sampling pulses 67~71. For instance, in the sample and hold circuit of FIG. 15, the input signal 84 and the output signal 90 are equal except for a slight difference in transmission time therebetween when the switch 87 conducts, whereby the signal is considered as having bypassed the hold capacitor 88. When such sample and hold circuits $S_o$~$S_N$ are used in the arrangement of FIG. 12, it is accordingly possible to obtain a beam former having the intended functions by using the circuits exemplified in FIG. 20 as the sampling pulse generating means 58. The difference between those shown in FIGS. 20 and 19 is that it is controllable whether or not the pulse length is extendable by imparting a control signal 115 to the pulse stretcher 114. The number of bits of effective data stored in the memory 109 is increased by one bit, which is employed as the control signal 115.

What is claimed is:

1. An ultrasonic wave receiving apparatus comprising:

a plurality of transducer elements arranged regularly;

a plurality of sample and hold circuits for sampling and holding signals respectively received by the transducer elements or groups of signals obtained by adding a predetermined number of the signals together; and controller means for generating control signals respectively for controlling said sample and hold circuits so as to sample said receiving signals or groups of signals at a time corresponding to the phases of said signals or groups of signals, said controller means including means for comparing a sampling time interval corresponding to a time between the respective phases of receiving signals from the transducer elements adjacent to each other or the groups of signals adjacent to each other with a predetermined value determined in accordance with a settling time of the sample and hold circuits and for generating control signals for enabling sampling of the receiving signals from the transducer elements adjacent to each other or the groups of signals adjacent to each other at the same time when the smapling time interval is less than the predetermined value.

2. An ultrasonic wave receiving apparatus as claimed in claim 1, wherein said predetermined value is equivalent to the settling time of said sample and hold circuit.

3. An ultrasonic wave receiving apparatus as claimed in claim 1, wherein said threshold is half the settling time of said sample and hold circuit.

4. An ultrasonic wave receiving apparatus as claimed in claim 1, wherein receiving signals from said transducer elements adjacent to each other or groups of transducer elements adjacent to each other are simultaneously sampled by different sample and hold circuits, respectively.

5. An ultrasonic wave receiving apparatus as claimed in claim 1, wherein said sample and hold circuits and said controller means constitute a quadrature sampling system.

6. An ultrasonic receiving apparatus comprising:
a plurality of transducer elements arranged regularly;
a plurality of sample and hold circuits for sampling and holding signals respectively received by said transducer elements; and
controller means for generating control signals respectively for controlling said sample and hold cicuits so as to sample said receiving signals at a time corresponding to the phases of said signals, said controller means including means for comparing a sampling time interval corresponding to a time between the respective phases of receiving signals from two transducer elements adjacent to each other with a predetermined value determined in accordance with a settling time of the sample and hold circuits for the receiving signals and for generating control signals for enabling sampling of the receiving signals from two transducer elements adjacent to each other at the same time when the sampling time interval is less than predetermined value.

7. An ultrasonic wave receiving apparatus as claimed in claim 6, wherein said sample and hold circuits and controllers controller means constitute a quadrature sampling system.

8. An ultrasonic wave receiving apparatus as claimed in claim 6, wherein said predetermined value is equivalent to the settling time of said sample and hold circuit.

9. An ultrasonic wave receiving apparatus as claimed in claim 6, wherein said predetermined value is half the settling time of said sample and hold circuit.

10. An ultrasonic wave receiving apparatus as claimed in claim 6, wherein if said sampling time interval of the sampling time determined corresponding to the respective phases of the receiving signals of two transducer elements adjacent to each other is $\tau$ and the settling time of the sample and hold circuits for the receiving signals is $\tau_o$, said sample and hold circuit will sample the receiving signals at the same time when $$\tau < \tau_o/2$$

and at the time different from each other by $\tau_o$ when $$\tau_o/2 \leq \tau < \tau_o.$$

11. An ultrasonic wave receiving apparatus as claimed in claim 6, wherein the sampling time of the signals respectively received by said transducer elements is quantized with the settling time of said sample and hold circuits as a quantization step.

12. An ultrasonic wave receiving apparatus comprising:
a plurality of transducer elements arranged regularly;
a plurality of first delay circuits for respectively delaying the signals received by said transducer elements for a relatively short time;
a plurality of first adders for adding receiving signals delayed by said delay circuits, a predetermined number of the signals being added together at a time;
a plurality of analog-to-digital converters for respectively converting the outputs of said first adders into digital signals;
a plurality of second delay circuits for respectively delaying the outputs of said analog-to-digital converts for a relatively long time;
a second adder for adding together the respective outputs of said second delay circuits; and
means for comparing a sampling time interval corresponding to a time between the phases of analog signals into analog-to-digital converts adjacent to each other with a predetemined value determined in accordance with a settling time of a sample and hold action of the analog-to-digital converters and for enabling said two analog-to-digital converters adjacent each other to respectively sample the analog signals at the same time when the sampling time interval is less than the predetermined value.

13. An ultrasonic wave receiving apparatus as claimed in claim 12, wherein said first delay circuit is the sample and hold circuit.

14. An ultrasonic wave receiving apparatus as claimed in claim 12, wherein said second delay circuit is a memory device.

15. An ultrasonic wave receiving apparatus as claimed in claim 12, wherein said predetermined value is equivalent to the settling time of said analog to digital converter.

16. An ultrasonic wave receiving apparatus as claimed in claim 12, wherein said predetermined value is equivalent to half the settling time of said analog to digital converter.

17. An ultrasonic wave receiving apparatus as claimed in claim 12, wherein if said sampling time interval of the sampling time determined corresponding to the respective phases of the signals in the two analog to ditigal converters adjacent to each other is $\tau$ and said settling time of the sample and hold action in the analog to digital converters is $\tau_o$, said analog to digital converters will sample the analog signals at the same time when $$\tau < \tau_o/2$$

and at the different from each other by $\tau_o$ when $$\tau_o/2 \leq \tau < \tau_o.$$

18. An ultrasonic wave receiving apparatus as claimed in claim 12, wherein the sampling time of the analog signals in said analog to digital converters is quantized with the settling time of said analog to digital converters as a quantization step.

19. An ultrasonic wave receiving appparatus comprising:
a plurality of transducer elements arranged regularly;
a plurality of sample and hold circuits for sampling and holding signals respectively received by the transducer elements or groups of signals obtained by adding a predetermined number of the signals together;
first controller means for generating control signals for respectively controlling said sample and hold circuits in such a manner as to sample said receiving signals or groups of signals at a time corresponding to the phases of said signals or groups of signals;

a plurality of adders for adding receiving signals held by said sample and hold circuits to receiving signals which are to be sampled subsequent thereto;

a pluraity of signal channels for respectively introducing said receiving signals to said adders while bypassing the respective sample and hold circuit; and second controller means for comparing a sampling time interval between two receiving signals to be sampled in the order corresponding to the respective phase thereof with a predetermined value determined in accordance with a settling time of the sample and hold circuits and for controlling making and breaking of said signal channels so that one of the two receiving signals which should be first sampled is allowed to bypass the sample and hold circuit when the sampling time interval is less than the predetermined value.

20. An ultrasonic wave receiving apparatus as claimed in claim 19, wherein said predetermined value is equivalent to the settling time of said sample and hold circuit.

21. An ultrasonic wave receiving apparatus as claimed in claim 19, wherein said predetermined value is half the settling time of the said sample and hold circuit.

22. An ultrasonic wave receiving apparatus as claimed in claim 19, wherein said receiving signal sampling time is quantized with the settling time of said sample and hold circuit as a quantization step.

23. An ultrasonic wave receiving apparatus as claimed in claim 19, wherein said sample and hold circuits and said first controllers controller means constitute a quadrature sampling system.

* * * * *